March 6, 1951     E. BRUST     2,544,295

ANIMAL TRAP

Filed Jan. 24, 1946

INVENTOR

Erich Brust.

Patented Mar. 6, 1951

2,544,295

UNITED STATES PATENT OFFICE 2,544,295

ANIMAL TRAP

Erich Brust, Norwood, N. J.

Application January 24, 1946, Serial No. 643,141

2 Claims. (Cl. 43—81)

This invention relates to animal traps having a spring-actuated jaw and a cooperating release mechanism mounted on a base the front portion of which serves as or comprises a bait holder. In particular, the present invention is concerned with an improvement in and a simplification of the construction of animal traps of the type in which said base is adapted to be rockably supported on a surface, and in which a tilting or rocking motion imparted to the trap causes actuation of the release mechanism and consequent closing of the spring-actuated jaw.

Traps of this type have been described in my previous Patent No. 2,263,161 which discloses a release mechanism comprising a plurality of linked elements employed to transmit the tilting motion of the front portion of the base to a catch thereby causing the latter to release a jaw-retaining trigger and thus spring the trap.

The principal object of the present invention is the elimination of the aforementioned plurality of linked elements and the substitution of a single element performing all the functions of said plurality of elements. A further object is a simplification in the construction of animal traps of the above mentioned type, resulting in a considerable reduction in the cost of their manufacture due to savings in the production and assembly of parts. Another object of the invention is to provide an animal trap of greatly increased sensitivity and of such simple construction as to permit the use of standard manufacturing procedure employed in making conventional traps of this kind. Still another object of the invention is to provide means for varying the sensitivity of the trap by simple manipulation of a single element.

In its essential aspect the invention consists of an animal trap comprising a rockable base and a spring-actuated jaw mounted thereon, said jaw being released to close the trap by the downward motion of the front portion of said base which motion is transmitted to a jaw-releasing trigger by a single element sensitive to such motion.

One modification of the invention is shown by way of example in the accompanying drawing in which.

Referring now to the above described drawing, the trap comprises a base B capable of rocking about a fulcrum F constituted by two or more staples or lugs 10 aligned in a straight row extending across the bottom of the base B. Mounted on top of said base is a jaw J actuated by the pressure of a spring S and retained against said spring pressure in the open position by a trigger T hinged to the base by means of the staple 11. To facilitate the setting of the trap, a safety latch 12 is provided which operates in the conventional manner by being adapted to retain the jaw J in the open position during manipulation of the trigger T.

A depression 14 in the front portion of the base serves to hold the bait although such depression or any other bait-holding means are not essential for the operation of the trap. In fact, the trap may be effectively used without any bait by simply placing it in the anticipated path of the animal in such a manner that the animal will be induced or compelled to cross over or merely touch the front portion of the base.

Figure 1:
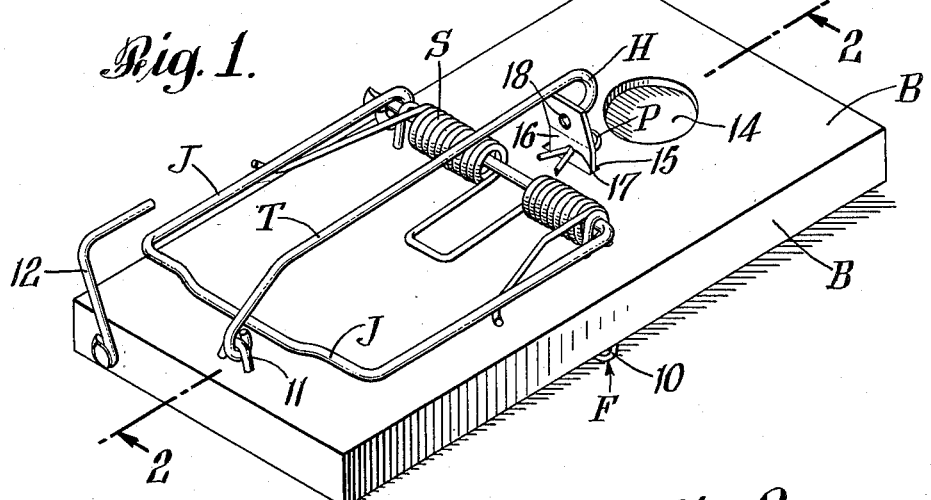
Fig. 1 is a perspective view of the trap from the rear portion of the base towards the front portion thereof, the trap being shown in the open or set position.
Figure 2:
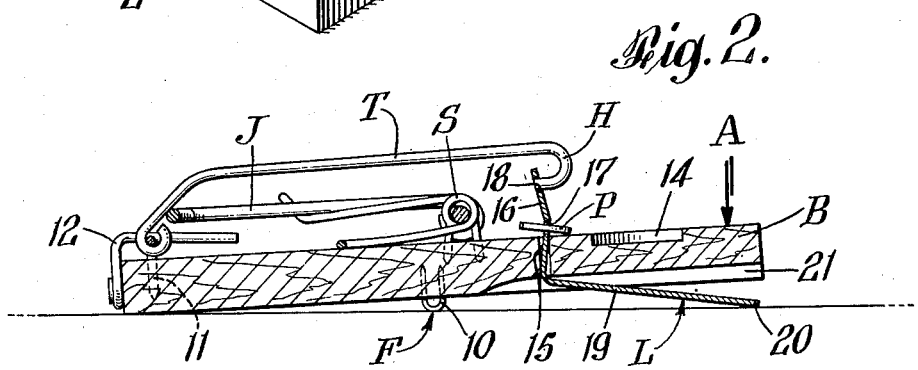
Fig. 2 is a central vertical section of the trap taken along line 2—2 in Fig. 1.
Figure 3:
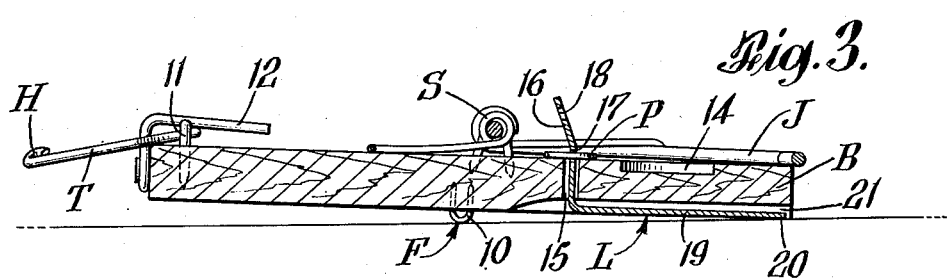
Fig. 3 is a similar vertical section, showing the trap in the closed or sprung position.

The position of the fulcrum F and the weight distribution of the various elements mounted on top of the base are such that, in the open or set position, the rear portion of the base B rests on the supporting surface while the front portion of the base is slightly raised therefrom, as shown in Fig. 1. The slightest pressure on said front portion in the direction of the arrow A in Fig. 2 will dislodge the jaw J from its open position, as described below, and thereby cause a shift in the aforementioned weight distribution towards the front portion of the base, as a result of which the trap is tilted to the inoperative position shown in Fig. 3.

The jaw J is released and the trap sprung by the action of a two-armed lever L pivotally secured to the top of the base B by a pin P. This lever constitutes the single actuating element shown in detail in Fig. 4. Said lever L extends upwardly through an aperture 15 in the base B and is freely swingable therein. One arm 16 of said lever L protrudes above the base B and is provided with an aperture 17 adapted to receive the pin P, and with a further aperture 18 adapted to receive the free end of the trigger T. The other arm 19 of the lever L extends longitudinally underneath the front portion of the base B, its free end 20 resting upon the supporting surface, irrespective of whether the trap is in the operative position shown in Figs. 1 and 2, or in the inoperative position shown in Fig. 3. A recess 21, accommodating the arm 19, may be provided in the bottom of the base B to insure positive action of the lever L and facilitate packaging of the trap. It is apparent that the lever L may be manufactured in an extremely economical manner by punching two longitudinally spaced holes near one end of a strip of rigid material and flexing such strip transversely along a predetermined line.

The trap functions in the following manner: the jaw J is placed in the operative position by swinging it towards the front of the trap against the pressure of the spring S until it overlies the front portion of the base B where it is held by the trigger T the free end of which is inserted into the aperture 18 provided in the arm 16 of lever L, as shown in Fig. 1. In this open or set position of the trap, the front portion of the base B is raised from the supporting surface due to a slight preponderance of weight on the rear portion of the base, as described above. The arms 16 and 19 of lever L are in the position indicated in Fig. 2, the arm 16 extending diagonally through the aperture 15 thereby frictionally engaging portions of opposite inner walls of said aperture, and the extreme end 20 of the arm 19 lightly resting on the supporting surface. The load exerted by the tightened spring S is transmitted through the jaw J to the trigger T but the tendency of the latter to swing upwardly under the influence of said load is counteracted by the arm 16 to which the trigger T is releasably secured. Said arm 16 is prevented from yielding to the upward pull of the trigger T by the position of the arm 19, integral with the arm 16 and at least partly bearing against the bottom of the front portion of the base B when the trap is in the open or set position. The arm 16 thus acts like a catch with regard to the trigger T. If now this delicately balanced open position of the trap is disturbed by the slightest pressure exerted upon the front portion of the base B in the general direction of the arrow A (Fig. 2), as for example by an animal touching the top surface of said front portion, the latter is instantaneously lowered towards the arm 19 or, as it were, the arm 19 is thrust upwardly by the supporting surface towards the bottom of said front portion. This upward motion of the arm 19 causes the lever L to move about its pivot, constituted by the pin P, and consequently results in a corresponding motion of the arm 16 towards the rear portion of the base B. As a consequence of such rearward motion, the arm 16 disengages the trigger T by slipping off the free end of the latter, thus permitting the jaw J to swing instantaneously, under the load of the spring S, from the front portion to the rear portion of the base and to assume the position shown in Fig. 3, thereby closing the trap.

Since the upward motion of the arm 19 produces a corresponding rearward motion of the arm 16 as described above, the trigger T must engage said arm 16 in such a manner that its rearward motion will result in a disengagement of the trigger from the arm 16 to release the jaw J. For this reason, the free end of the trigger T forms a hook H which is open towards the rear of the trap thus permitting the arm 16 to slide off the hook H when moving towards the rear.

Figure 4:
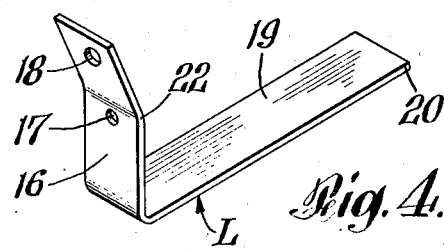
Fig. 4 is a detailed perspective view of one modification of the single actuating element on a slightly enlarged scale.

By varying the bend of the arm 16, indicated at 22 in Fig. 4, the sensitivity of the trap may be varied in consequence of the resulting lengthening or shortening of the arc through which the arm 16 has to move to disengage the trigger. Such bend in the arm 16, however, is not an essential but merely an optional feature of the invention since the trap would function in the same general manner if the arm 16 were straight.

These and other modifications may be made in the construction disclosed above without departing from the principle of my invention, and I therefore do not limit myself to the exact details herein shown and described.

I claim:

1. An animal trap comprising, in combination, a base, a fulcrum on the bottom of said base adapted to rockably engage a supporting surface and to space the front portion of said base from said surface; a spring-actuated jaw adapted to close the trap in cooperation with said front portion, a trigger adapted to retain and release said jaw, and means for releasing said trigger, said means including a two-armed unitary lever, adapted to rest with the extreme end of one of its arms upon said supporting surface and to releasably engage said trigger at the extreme end of the other one of its arms, said base being provided with an oblong, substantially rectangular and relatively narrow aperture permitting said last mentioned arm of said lever to pass through said base, said lever being so disposed relative to said aperture that said last mentioned arm extends diagonally therethrough and frictionally engages portions of opposite inner walls thereof when in the operative position, said lever being adapted to pivot about a point near the lower part of said aperture and to swing freely through a relatively narrow arc within the same when moving into the inoperative position, the angle of the arc of said swinging motion being controlled by the distance between said opposite walls.

2. A trap as claimed in claim 1, in which said trigger-engaging arm of said lever is provided with a retaining pin extending transversely through said arm and across the upper part of said aperture, said pin being of such dimension and configuration to prevent its passage through said aperture.

ERICH BRUST.

REFERENCES CITED

The following references are of record in the file of this patent:

UNITED STATES PATENTS

| Number | Name | Date |
|---|---|---|
| 744,343 | Hooker | Nov. 17, 1903 |
| 871,809 | Marks | Nov. 26, 1907 |
| 2,260,872 | Schmidt | Nov. 28, 1941 |
| 2,263,161 | Brust | Nov. 18, 1941 |

FOREIGN PATENTS

| Number | Country | Date |
|---|---|---|
| 15,106 | Great Britain | of 1899 |